Jan. 4, 1938.  J. C. SIMONS ET AL  2,104,174

CLUTCH

Filed July 9, 1937

INVENTORS
Harold S. Swope &
John C. Simons
BY
Augustus B. Stoughton
ATTORNEY.

WITNESS:
Robt P. Kitchel.

Patented Jan. 4, 1938

2,104,174

UNITED STATES PATENT OFFICE 2,104,174

CLUTCH

John C. Simons and Harold S. Swope, Philadelphia, Pa.

Application July 9, 1937, Serial No. 152,730

3 Claims. (Cl. 192—69)

The principal object of the present invention is to provide a clutch of simple, compact and reliable construction and which is efficient and satisfactory in operation, especially where the available space is limited. Other objects of the invention will appear from the following description at the end of which the invention will be claimed.

Generally stated the invention comprises a clutch structure including a hub having a cap at one end and a power transmission element at the other end and having an internal seat, and a movable disk arranged in the hub, and a series of friction clutch elements arranged in the hub and interposed between the seat and disk and of which one set engages the hub, and a spring interposed between the end of the hub and the disk and pressing upon the clutch elements; and a mounting for the clutch structure including an endwise immovable housing having a screw projecting thru its wall into rotatable contact with the cap to vary the strength of the spring; said clutch structure and mounting adapted to receive an endwise immovable power transmission shaft of which the end constitutes an abutment for the disk and which engages the other set of clutch elements and in respect to which the hub is endwise moveable and rotatable.

The invention also comprises the improvements to be presently described and finally claimed.

Figure 1:
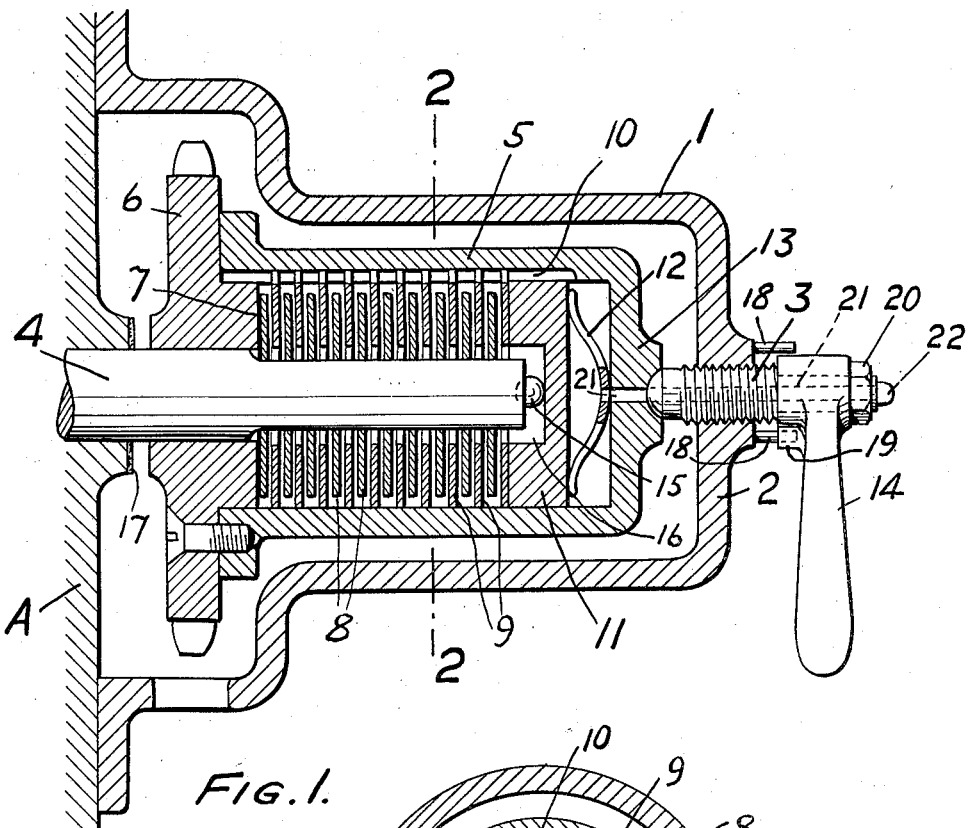

In the following description reference will be made to the accompanying drawing forming part hereof and in which, Figure 1 is a central sectional view of a clutch embodying features of the invention showing the clutch elements spread to an exaggerated degree for the sake of clearness.

Figure 2:
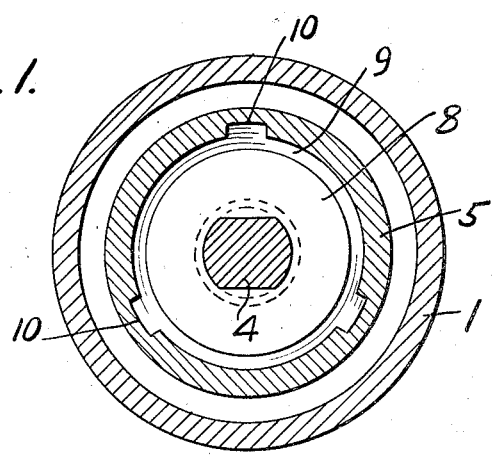

Figure 2 is a transverse sectional view taken on the line 2—2 of Fig. 1.

Referring to the drawing, 1 indicates a fixed housing having an end portion 2 and a screw 3 arranged thru the end portion. The housing 1 for sake of description fay be said to be attached to the structure of a gasoline motor. A indicates the structure of the motor which it is unnecessary to illustrate or describe. 4 is the power transmission shaft of the motor and it is devoid of endwise motion and it is aligned with the screw 3. 5 indicates a hub provided with a power transmission device 6 shown as a sprocket wheel although it may be in the form of a grooved or plane faced pulley or drum. The hub 5 and the device 6 are in effect one piece and are mounted for rotation in respect to the shaft 4 and the screw 3 and for endwise movement. There are a series of friction clutch elements operatively arranged between the hub 5 and the shaft 4 and at one end in contact with the hub 5 or more accurately with a seat 7 provided in the hub at one end thereof. One series of disks 8 is provided with an aperture deformed from a circle and with which the contour of the shaft 4 corresponds, the other set of disks 9 are provided with lugs which are arranged in grooves 10 disposed lengthwise of the hub. 11 is a disk mounted rotatably at the end of the shaft 4 and it is arranged in the hub 5 in contact with the end of the series of friction elements. 12 is a spring interposed between the end 13 of the hub and the disk 11; obviously it may assume any one of a variety of well known forms.

The screw 3 is turned by a handle 14 and it operates to shift the hub 5 and its connected transmission element 6 on the shaft 4 in respect to the disk 11 and this controls the compression or degree of compression of the spring 12 and in that way controls the pressure on the clutch elements which may be sufficient to cause the hub to run with or turn with the shaft 4 or to remain at rest whilst the shaft 4 continues to rotate. The ball 15 provides an anti-friction bearing for the disk 11 in respect to the end of the shaft 4. There is in the disc 11, a cavity 16 having a circular bounding wall which in connection with the end of the shaft 4 serves to keep the outer end of the mechanism concentric with the shaft 4 when the screw 3 is backed off. 17 indicates a brake lining or surface which in cooperation with the face of the power transmission device 5 provides an automatic brake for the latter and for the parts connected therewith. Between the handle 14 and the fixed housing 1 are interposed stops 18 and 19 which limit the turning movement of the handle 14 and screw 3. The handle 14 is angularly adjustable in respect to the screw 3 and for this purpose their meeting surfaces are suitably roughened, and the nut 20 affords means for detaching the parts when this adjustment is to be made. By their meeting surfaces is meant the left hand vertical surface of the body of the handle 14 and the right hand vertical surface of the screw 3. 21 indicates a passage for the introduction of lubricant and it is closed by a suitable cap 22.

It will be obvious to those skilled in the art to which the invention relates that modifications may be made in details of construction and arrangement without departing from the spirit of the invention which is not limited in respect to such matters or otherwise than as the prior art and the appended claims may require.

We claim:

1. A clutch comprising the combination of a fixed housing having an end portion and having a screw arranged thru its end portion, a power transmission shaft substantially devoid of endwise motion and aligned with the screw and projecting into the housing, a hub provided with a power transmission device and mounted for rotation in respect to the shaft and to the end of the screw and for endwise motion, a series of friction drive clutch elements operatively arranged between the hub and shaft and at one end in contact with the hub, a disk rotatably mounted at the end of the shaft and arranged in the hub and in contact with the other end of the series of friction elements, and spring means interposed between the end of the hub and the disk to exert compression on the clutch elements, the screw operating to shift the hub in respect to the disk to control the compression of the spring.

2. A clutch comprising the combination of a fixed housing having an end portion and having a screw arranged thru its end portion, a power transmission shaft substantially devoid of endwise motion and aligned with the screw and projecting into the housing, a hub provided with a power transmission device and mounted for rotation in respect to the shaft and to the end of the screw and for endwise motion, a series of friction drive clutch elements operatively arranged between the hub and shaft and at one end in contact with the hub, a disk rotatably mounted at the end of the shaft and arranged in the hub and in contact with the other end of the series of friction elements, spring means interposed between the end of the hub and the disk to exact compression on the clutch elements, and an anti-friction bearing element between the end of the shaft and the disk, the screw operating to shift the hub in respect to the disk to control the compression of the spring.

3. In combination a clutch structure comprising a hub having a power transmission element and an internal seat, and a movable disk arranged in the hub and a series of friction clutch elements arranged in the hub and interposed between the seat and disk, and a spring interposed between the end of the hub and the disk and pressing the clutch elements; and a mounting for the clutch structure including an endwise immovable housing having a screw projecting thru its wall into rotatable contact with the hub to vary the strength of the spring; said clutch structure and mounting adapted to receive an endwise immovable power transmission shaft of which the end constitutes the abutment for the disk and which engages the set of friction elements and in respect to which the hub is endwise movable and rotatable.

JOHN C. SIMONS.
HAROLD S. SWOPE.